(12) United States Patent
Sanders et al.

(10) Patent No.: US 12,214,277 B2
(45) Date of Patent: Feb. 4, 2025

(54) METHOD AND DEVICE FOR GENERATING VIDEO FRAMES

(71) Applicant: Sony Interactive Entertainment Inc., Tokyo (JP)

(72) Inventors: Matthew William Sanders, London (GB); Fabio Cappello, London (GB); Timothy Bradley, London (GB); Jessica Rose Grant, London (GB); Maurizio Cerrato, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 365 days.

(21) Appl. No.: 16/906,198

(22) Filed: Jun. 19, 2020

(65) Prior Publication Data

US 2021/0001216 A1    Jan. 7, 2021

(30) Foreign Application Priority Data

Jul. 1, 2019  (GB) ..................................... 1909447

(51) Int. Cl.
*A63F 13/352*    (2014.01)
*A63F 13/327*    (2014.01)
(Continued)

(52) U.S. Cl.
CPC .......... *A63F 13/352* (2014.09); *A63F 13/327* (2014.09); *A63F 13/335* (2014.09);
(Continued)

(58) Field of Classification Search
CPC .... A63F 13/352; A63F 13/327; A63F 13/335; A63F 13/525; A63F 13/573
See application file for complete search history.

(56) References Cited

U.S. PATENT DOCUMENTS 10,449,461 B1 *  10/2019  Verma ................... A63F 13/424
2017/0243324 A1   8/2017  Mierle
(Continued)

FOREIGN PATENT DOCUMENTS

| EP | 3760287 A1 | 1/2021 |
| WO | 2006129308 A1 | 12/2006 |
| WO | 2019226374 A1 | 11/2019 |

OTHER PUBLICATIONS

Communication pursuant to Article 94(3) for corresponding EP Application No. 20178290.1, 6 pages, dated Nov. 25, 2021.
(Continued)

*Primary Examiner* — William H McCulloch, Jr.
*Assistant Examiner* — Ankit B Doshi
(74) *Attorney, Agent, or Firm* — Kilpatrick Townsend & Stockton LLP

(57) ABSTRACT

A method of generating video frames for a cloud-based video game includes obtaining, via a communications network, a plurality of frames of a video game rendered at a cloud device; obtaining a player input received at an input device, the input device being used to play the video game, the player input being received in response to the display of at least one of the obtained video frames; inputting at least one of the obtained video frames and the player input to a prediction model; and synthesizing, based on the output of the prediction model, a subsequent frame for output at a display, and outputting the synthesized video frame at the display.

16 Claims, 3 Drawing Sheets

(51) Int. Cl.
  *A63F 13/335* (2014.01)
  *A63F 13/525* (2014.01)
  *A63F 13/573* (2014.01)
  *G06N 3/08* (2023.01)
  *G06N 20/00* (2019.01)
(52) U.S. Cl.
  CPC .......... *A63F 13/525* (2014.09); *A63F 13/573* (2014.09); *G06N 3/08* (2013.01); *G06N 20/00* (2019.01)

(56) References Cited

U.S. PATENT DOCUMENTS

| | | | |
|---|---|---|---|
| 2018/0091791 A1* | 3/2018 | Jiang | H04N 13/388 |
| 2018/0101930 A1* | 4/2018 | Kopf | G09G 5/363 |
| 2019/0358541 A1* | 11/2019 | Bronder | H04L 65/4069 |
| 2020/0306632 A1* | 10/2020 | Kolen | A63F 13/79 |

OTHER PUBLICATIONS

Examination Report for corresponding GB Application No. 1909447. 3, 2 pages, dated Apr. 13, 2021.
Search Report for corresponding GB Application No. GB1909447. 3, 1 page, dated Nov. 19, 2019.
Extended European Search Report for corresponding EP Application No. 20178290.1, 11 pages, dated Aug. 12, 2020.
William R Mark et al: "Post-Rendering Image Warping for Latency Compensation UNC-CH Computer Science Technical Report #96-020," 6 pages, Nov. 25, 1996.
Nguyen-Ha Phong et al: "Predicting Novel Views Using Generative Adversarial Query Network," ROBOCUP 2008: ROBOCUP 2008: Robot Soccer World Cup XII; [Lecture Notes in Computer Science; Lect.Notes Computer], Springer, pp. 16-27, May 12, 2019.
S. M. Ali Eslami et al: "Neural scene representation and rendering," Science, vol. 360, No. 6394, 8 pages, Jun. 15, 2018.
Peter Hedman et al:"Deep blending for free-viewpoint image-based rendering" ACM Transactions on Graphics vol. 37, No. 6, Article 257, pp. 1-15, Nov. 2018.
William R Mark et al: "Post-rendering 3D warping," Proceedings of 1997 Symposium on Interactive 3 D Graphics, pp. 7-16, Apr. 30, 1997.
Shu Shi et al: "Real-time remote rendering of 3D video for mobile devices," ACM 09 Proceedings of the 17th ACM International Conference on Multimedia, pp. 391-400, Oct. 19, 2009.

* cited by examiner

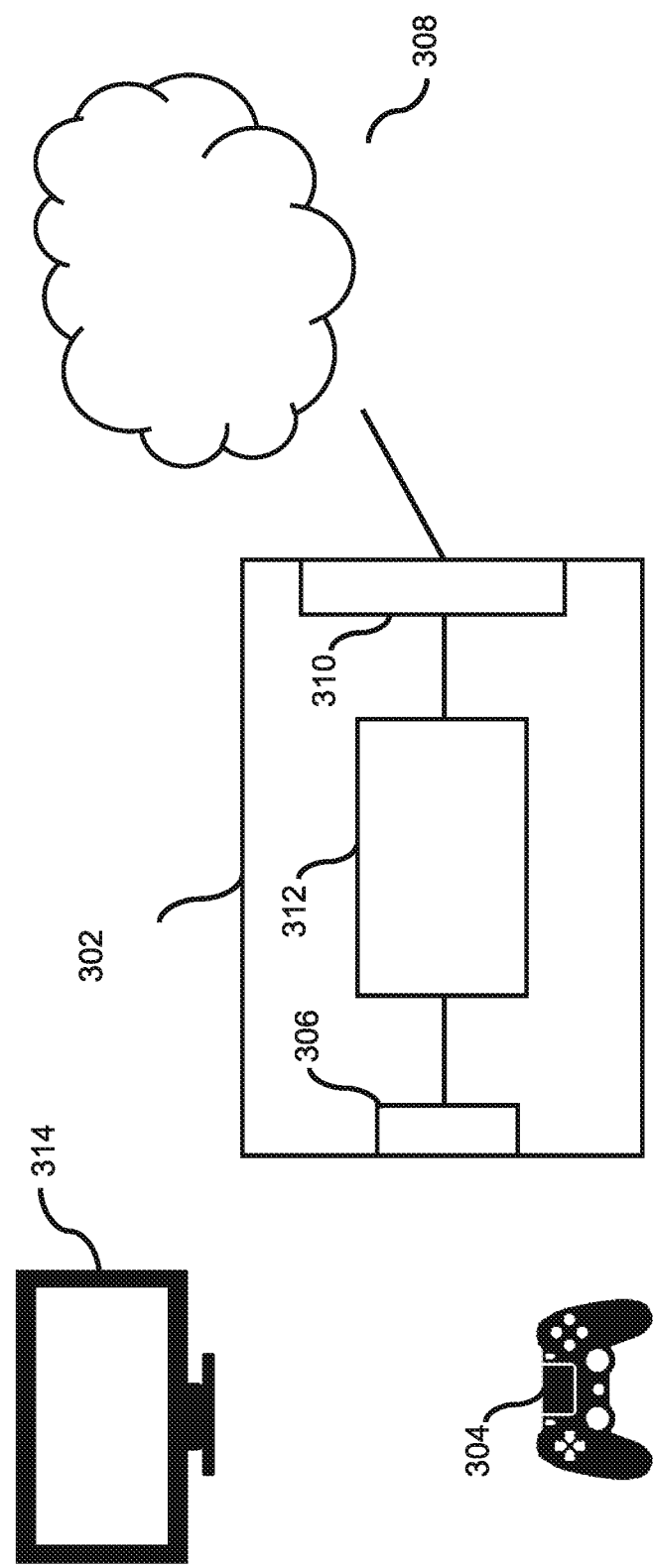

METHOD AND DEVICE FOR GENERATING VIDEO FRAMES

BACKGROUND OF THE INVENTION

Field of the Invention

The present disclosure relates to a method and device for generating video frames.

Description of the Prior Art

Cloud gaming enables at least some of the storing, executing and rendering of a video game to be performed at a remote device, instead of at a local client device. In a typical set up, player inputs received at a client device are transmitted to a server, which updates the video game accordingly. The server sends information back to the client device, enabling an appropriate view of the video game to be displayed to the player. The client device and server are typically in communication via a communications network, such as the Internet. The client device may be described as 'thin' in the sense that it has limited processing and rendering capability relative to the server. For example, the client device may simply receive player inputs and cause video received from the server to be displayed at an associated display.

A known problem with cloud gaming is that there can often be a lag between the provision of player inputs and the updating of a respective player's view of a virtual environment (corresponding to a video game). This may arise as a result of issues associated with the connection between the client and e.g. the server. For example, internet latency, bandwidth limitations, network traffic, packet loss, etc. occurring on the network may limit the perceived responsiveness of the video game. In some cases, the video game may feel unplayable, with player inputs appearing to be out of sync with the action being displayed on the screen.

The present invention seeks to address or at least alleviate this problem.

SUMMARY OF THE INVENTION

According to a first aspect disclosed herein, there is provided a method in accordance with claim 1.

According to a second aspect disclosed herein, there is provided a computing device in accordance with claim 10.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 shows schematically an example of a cloud gaming system in accordance with the present disclosure.

DESCRIPTION OF THE EMBODIMENTS

Figure 1:
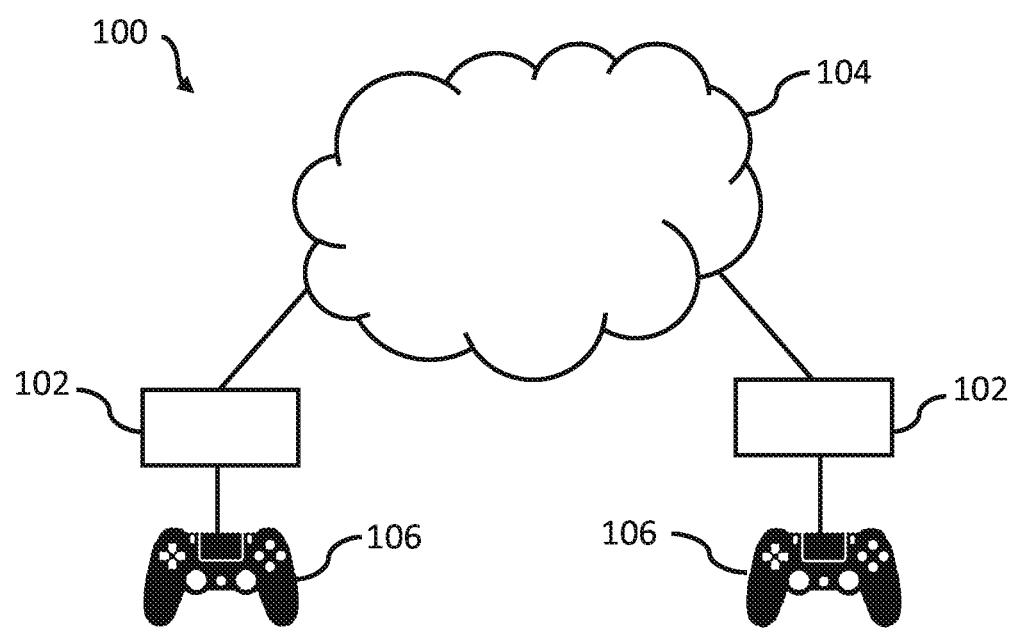
FIG. 1 shows schematically shows an example of a cloud gaming system.

Referring now to the drawings, wherein like reference numerals designate identical or corresponding parts throughout the several views, FIG. 1 shows schematically an example of a cloud gaming system 100.

In FIG. 1, two client devices 102 are shown as being connected to a cloud gaming service 104. The cloud gaming service 104 enables each client device 102 to access video games stored at one or more cloud devices (not shown) making up the cloud gaming service 104. The cloud devices may comprise, for example, one or more servers operable to execute video game code. The client devices 102 may be in communication with the cloud devices, via a communications network (which in FIG. 1 is represented as part of the cloud gaming service 104). In FIG. 1, two client devices 102 are shown so as to indicate that more than one client device may connect to the cloud gaming service 104 at a given time.

A user may initiate a video game session for a particular video game via their client device 102, for example by navigating an appropriate game menu. Once the video game session has been established, player inputs received at or via the client device 102 may be transmitted to the one or more cloud devices via the communication network. The one or more cloud devices may be configured to render, based on the player inputs, corresponding frames of the video game. The rendered video frames may then be transmitted to the client device 102, via the communications network, in the form of a video stream. The video stream may correspond to a view of a virtual environment that has been updated in accordance with the inputs of the local player and any other remote players.

The cloud gaming service 104 may enable players to participant in online multiplayer video games. For example, in FIG. 1, each client device 102 may be associated with a respective player, with each player having an avatar that concurrently occupies a shared virtual environment. Alternatively, or in addition, it may be that the cloud gaming service 104 enables client devices to access separate instances of the same video game, or completely different video games. In any case, the execution and rendering of the video game is performed predominantly at one or more cloud devices making up the cloud gaming service 104.

A client device 102 may comprise a display, and the video stream received from the cloud gaming service 104 may be displayed at the display of the client device 102. This may be the case where, for example, the client device 102 comprises a smartphone, tablet, smart TV, laptop, personal computer (PC), portable games console, HMD, etc. In other examples, the client device 102 may be in communication with an external display and configured to cause the received video stream to be displayed at the external display. For example, the video stream may be transmitted from the client device 102 to the external display, optionally via a dongle connected to the external display. In some examples, it may be that the client device 102 has no display, e.g. where the client device 102 comprises a games console or set-top box, and the received video stream is transmitted to an external display that is in communication with the client device 102.

In some examples, a client device 102 may be associated with a separate input device 106 for receiving player inputs. The separate input device 106 may include, for example, a games controller, head-mountable display (HMD), mouse, keyboard, touchscreen, air-point device, camera, microphone, etc. The input device 106 may be connected to the client device 102 via a wired or wireless connection. In some examples, the input device 106 may be incorporated into the client device 102. In FIG. 1, each client device 102 is shown as being in communication with a games controller. The games controller shown in FIG. 1 corresponds to a DualShock 4™. The games controller may include at least one of: physical buttons, a touchpanel or touchscreen, motion sensor, microphone, etc.

In some examples, the input device 106 may connect directly to the cloud gaming service 104. For example, the input device 106 may comprise a Wi-Fi enabled games controller, and player inputs received at the games controller may be transmitted directly to the cloud gaming service (via e.g. a router). In these examples, the client device may correspond to a display device that simply receives the video stream rendered by the one or more cloud devices forming the cloud gaming service.

It will be appreciated that, whilst the above examples have been described in relation to client devices 102 connected to one or more servers (forming the cloud gaming service 104) via a communications network, in some examples, the execution and rendering of a video game may be performed at a remote client device that a local client device is in communication with, via a communications network. For example, a remote client device may have installed thereat a copy of a video game, and the user of that client device may make that copy of the video game available to another (local) client device 102, via the communications network. In this way, the local client device 102 may access the copy of the video game installed at the remote client device. In such examples, the cloud device may correspond to a remote client device that a local client device 102 is in communication with via the communications network. The local client device 102 may be configured to receive video frames rendered by the remote client device.

In yet further or alternative examples, the execution and rendering of the video game may be distributed across multiple remote client devices such that the cloud gaming service 104 is formed of a peer-to-peer (P2P) network that a local client device 102 is able to access via the communications network.

As mentioned previously, a known drawback with cloud gaming systems is latency. This may arise as a result of e.g. the distance between a client device and the nearest server hub making up the cloud gaming service. The time taken to transmit player inputs over the network, and to receive an appropriate response from the cloud may result in the video game feeling unresponsive. Generally, a delay of 150 ms or more between the provision of player inputs and update of the display can result in a video game feeling unplayable. A known technique for addressing this problem involves providing edge locations closer to users; that is, extending the cloud gaming service such that the nearest server hub is closer to the user. As will be appreciated, this is a time-consuming and expensive process and may not always be feasible for certain locations. An alternative solution may involve accessing the video game via a remote client device instead of via a server hub. However, there is still no guarantee that the nearest remote client device having a copy of the video game will be sufficiently close to the local client device, in order for a perceptible lag in gameplay to be avoided.

Figure 2:
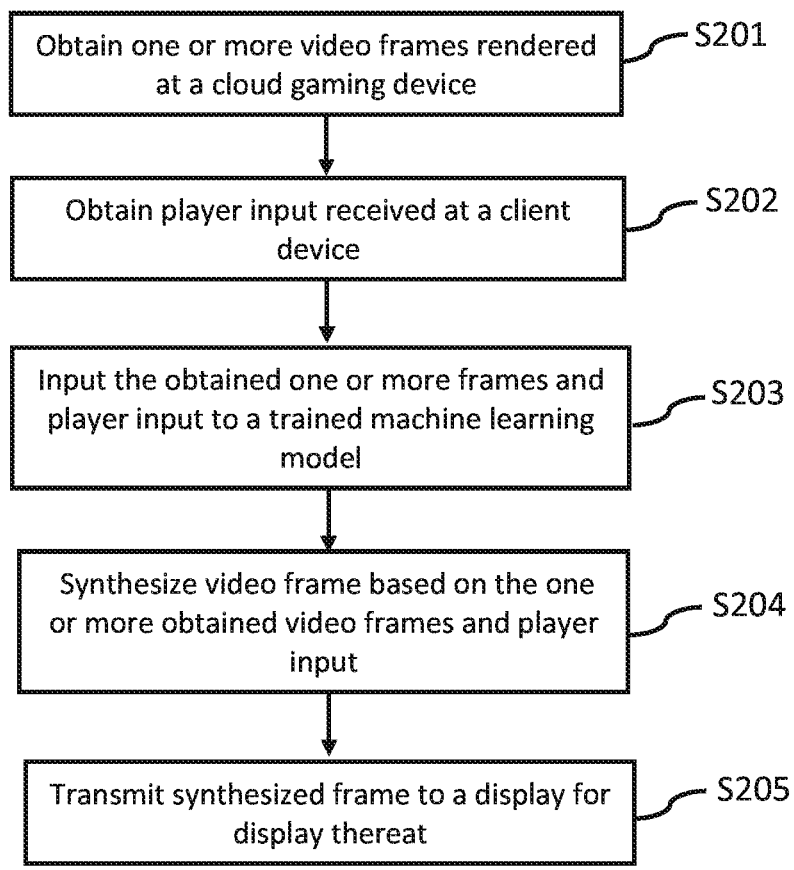
FIG. 2 shows an example of a method for predicting future frames in accordance with the present disclosure.

An example of a method for reducing the latency associated with cloud gaming will now be described in relation to FIG. 2. The method is typically implemented by a device local to the player, such as a client 102 or other intermediary whose own latency to the client is acceptably small (for example, on the same LAN as the client or using a direct link such as WiFi® direct or Bluetooth®).

At a first step S201, one or more video frames rendered at a cloud device are obtained, via a communications network. The communications network may correspond to a wide area network (WAN), such as the Internet. The rendered video frames may be received at the client device, or a separate intermediate device that sits between the client device (or input device) and the one or more cloud devices making up the cloud gaming service. The video frames correspond to the frames of a video game being rendered at one or more cloud devices making up the cloud gaming service. In some examples, it may be that the video frames are obtained in duplicate, with one version being output for display and the other being processed so as to predict the content of a subsequent (i.e. future) frame.

At a second step S202, a player input received at an input device being used to play the video game, is obtained. The player input may correspond to, for example, button presses (e.g. at a games controller), touch inputs, motion of the input device, motion of the user, etc. As mentioned previously, the client device may comprise an input device or be in communication with an external input device. The input device may correspond to any of the input devices described previously. The player input may be received at the client device or an intermediate device. The intermediate device may correspond to a USB-type device (i.e. dongle) having a connector operable to connect to a display device, with the display device being operable to receive video frames rendered by the cloud gaming service. The intermediate device may be further operable to receive player inputs from the input device.

The player input may have been made in response to a video frame previously or currently displayed at a display associated with the client device, this video frame being received from one or more cloud devices making up the cloud gaming service. The player inputs may be associated with a time stamp and this time stamp may be used to determine a frame that this player input corresponds with. For example, each frame may be associated with a frame time or frame number, and a player input may be determined as being made in response to the most recently displayed frame having a frame time or number that is closest to the timestamp associated with the player input. It will be appreciated that optionally the player input may instead be associated with that frame time or number, rather than having its own separate timestamp. The input device may correspond to any of the input devices described previously.

At a third step S203, at least one of the obtained video frames and player inputs are input to a prediction model. The prediction model is configured to synthesize, i.e. predict, a subsequent video frame, based on one or more previously rendered video frames and corresponding player inputs. Although the prediction model is referred to in the singular, in some embodiments, the prediction model may comprise a plurality of different models, with each model being configured to receive different types of data as an input.

Machine Learning Examples

In some examples, the prediction model comprises a machine learning model that is trained to synthesize video frames based on one or more previously rendered video frames and received player inputs. That is, the machine learning model is trained to predict, based on one or more previously rendered frames, and one or more previously received player inputs, one or more subsequent frames for displaying to the viewer. The machine learning model may comprise one or more neural networks trained to synthesize video frames based on previously rendered video frames and player inputs. In some examples, the prediction model may comprise a plurality of machine learning models, with each model being trained to perform at least one aspect of synthesizing a future video frame.

Training the machine learning model may involve for example, taking a set of consecutive frames as source frames, and any player inputs associated therewith, and using a subsequent frame as a target frame that is to be predicted from the source frames and corresponding player inputs. In this way, for each set of source frames, the subsequent frame may act as a ground-truth for training the machine learning model. The machine learning model may be deemed sufficiently trained based on a minimisation of the discrepancy between predicted frames and actual frames (i.e. via backpropagation). Once sufficiently trained, the machine learning model may be exported to the client device or an intermediate device.

The training data for the machine learning model may be obtained from previous cloud-gaming sessions. For example, the video frames rendered for previous cloud gaming sessions may be known, as well as the player inputs received in response to the outputting of those frames. This training data may be stored at e.g. a datacentre and made accessible to the one or more neural networks that are to be trained. Other training sources may alternatively or in addition be similarly used, such as quality assurance sessions run prior to a game's public release.

It will be appreciated that, for increased accuracy, the machine learning model may be trained for a specific video game. That is, with video frames rendered for, and player inputs received, for a specific video game. Training the machine learning model for a specific video game may greatly improve the results and reduce computational cost. This is because the types of game scene a player will encounter will be more limited, and so the machine learning model can be trained to recognise these scenes and learn how these are likely to change based on previously received player inputs. Furthermore, a machine learning model may be trained for a specific level or region of a videogame, where there is significant divergence in gameplay and/or appearance between such levels or regions. Subsequently the appropriate trained model can be selected (or downloaded) in response to the next level or region to be played.

Such a machine learning model may be trained to generate, i.e. synthesize, a video frame by applying at least one of an image transformation and filtering operation to an obtained video frame (said video frame being rendered by one or more cloud devices and being obtained therefrom).

The image transformations may include affine and or non-affine image transformations such as rotation, scale, shear, skew, perspective transformations, reflection, etc. For example, rotation of a virtual camera view may be simulated by translating and warping a previous frame using a rotation matrix, the degree of rotation being learnt by the machine learning model. A spatial transformer network (see e.g. 'Spatial Transformer Networks', M. Jaderberg, et al., Advances in Neural Information Processing Systems 31 (NIPS 2015) p. 1-15) may be used to apply the image transformations, with a perceptual loss function or e.g. peak-signal-to-noise-ratio (PSNR) function or structural similarity index (SSIM) measure being used to compare the source frames with target frames (i.e. ground-truth frames).

In some examples, image segmentation may be applied to a previously rendered frame so as to identify different regions within that frame requiring different image transformations. Alternatively or in addition, depth data associated with the frame may be used for this purpose. The need to identify different regions within the frame may arise due to the non-uniform nature in which different parts of the scene appear to move relative to a viewer when the viewer's perspective changes. For example, as a viewer translates their view, more distant objects will appear to be displaced further, relative to nearer objects. Similarly, as a viewer rotates their view, more distant objects may appear to cross the viewer's view at a faster rate than nearer objects. Accordingly, the method may involve identifying different regions within a given frame as corresponding to regions of a virtual environment located at different distances from the viewer, and applying corresponding image transformations to those regions.

An optional filtering operation may include one or more of blurring, high/low band pass filtering, Gaussian filtering, etc. The machine learning may be trained to learn which of these filtering operations results in a source frame being transformed into a frame that most closely corresponds to a subsequent target frame. This may involve, for example, training a recurrent (RNN) or convolutional neural network (CNN) or long short-term memory unit (LSTM) to learn a convolutional kernel for applying to a previously rendered frame, based on the image content of that frame and any player inputs associated therewith.

In alternative or additional examples, the machine learning model may comprise a Generative Adversarial Network (GAN) that is trained to synthesize video frames based on a previously rendered frame and the most recently received player input(s). The GAN may comprise a conditional GAN, or e.g. InfoGAN (see 'InfoGAN: Interpretable Representation Learning by Information Maximizing Generative Adversarial Nets', X. Chen, p. 1-14, arXiv:1606.03657, 2016) combined with a temporally stable generator/discriminator such as tempoGAN (see 'tempoGAN: A Temporally Coherent, Volumetric GAN for Super-resolution Fluid Flow', Y. Xie, p. 1-15, arXiv:1801.09710, 2018). The GAN may be trained on one or more preceding frames and inputs to output a new frame from the generator network, which is compared at the discriminator network with the actual generated frame. The GAN may be trained online (e.g. at a server) with updates pushed to client and/or intermediate devices when deemed stable.

The trained machine learning model may allow the frequency with which rendered (real) frames are sent from the cloud gaming service to the client device, to be reduced. This is because the machine learning model may be capable of predicting n subsequent frames, such that those frames do not need to be received from the cloud gaming service. In such a case, this may reduce the bandwidth associated with the communications network over which the frames of the video game are being provided by the cloud gaming service. This may also reduce power usage (e.g. CPU and or GPU usage) of a given cloud device performing the rendering. For example, because frames can be rendered less often, the calculations associated with that rendering, such as updating player models, may be performed less often. In such cases, the CPU(s) and GPU(s) of a given cloud device may be freed up for other client devices, enabling further video game sessions to be hosted by that cloud device.

Non-Machine Learning Examples

It will be appreciated that, in some examples, the prediction model may not necessarily employ machine learning in order to synthesize subsequent frames. For example, a subsequent frame may be predicted using a rule-based method, e.g. by analysing the image content of previous frames and previously received player inputs, and determining, based on e.g. a known correlation, an image transformation and/or filtering operation that should be performed on one or more previously rendered frames, so as to synthesize a subsequent frame.

In some examples, the prediction model may be configured to predict a subsequent frame by re-projecting a previous or current video frame. For example, it may be that a frame received at the client or intermediate device corresponds to a view of the virtual environment at a first render time, and that between the rendering and outputting of that frame, a further player input is received. Rather than waiting for the subsequent frame to be received from the server, the prediction model may apply an image transformation to the previous frame based on the (current) player input. The player input may be used to control the pose of a virtual camera, and the previous frame may be transformed so as to correspond to the new pose of the virtual camera. This may involve applying an image transformation corresponding to e.g. a rotation and/or translation of the virtual camera, in accordance with the received player input. The pose of the virtual camera (corresponding to the player's current view) may be received as metadata, along with the corresponding video frame.

An example of a re-projection technique that may be used is described in EP2979127, which describes the re-projection of an image for display at an HMD. However, in the present disclosure, re-projection may be applied to a video frame received from the cloud gaming service, in response to a player input received at an input device (which may be at e.g. a games controller and need not be limited to an HMD).

In some situations, it may be possible to predict subsequent player inputs, e.g. if a player is panning the virtual camera in a certain direction, it may be possible to predict the corresponding view of the virtual environment. Alternatively or in addition, it may be possible to predict how a user will change the pose of the virtual camera based on e.g. other objects in the game scene, the positions of other player characters and/or NPCs, in-game events, previous player inputs, etc. Hence, a corresponding re-projection may be applied to a previous or current frame, based on a predicted player input.

Re-projecting cloud-rendered video frames may assist in reducing the perceived latency associated with translation and/or rotating a virtual camera within the virtual environment, and in some cases, artificially increase the frame rate. However, as will be appreciated, re-projecting previously rendered frames in this way may be limited where new parts (not yet rendered) are coming into a player's view. As a result, additional information may be needed before a subsequent frame can be fully predicted.

It will be appreciated that, in some examples, it may be useful to identify a context within the video game before predicting a subsequent frame. For example, if a player is navigating a menu, the subsequent frames would be expected to relatively similar, with at least a few menu frames being output before gameplay. Thus, in some examples, the method may comprise identifying a context within a video game, and providing an indication of the identified context to the prediction model. An example technique for identifying different contexts within a video game is described in GB1819865.5. The prediction model may then use this information to inform the prediction. For example, by determining whether a predicted frame corresponds to the same game context, and preventing the output of that frame it is identified as corresponding to a different context.

ADDITIONAL CONSIDERATIONS

In some examples, the prediction model may be configured to synthesize a subsequent frame based on additional data. In examples where the prediction model corresponds to a trained machine learning model, the model may be trained with the additional data, in addition to the previously rendered frames and corresponding player inputs.

The additional data may pertain to one or more objects in the virtual environment, such as those in a viewing frustrum of the player. For example, the velocity of an object under the player's control may be an additional input to the prediction model. This data may be included as metadata, along with the image data corresponding to the video frames received from the one or more cloud devices forming part of the cloud gaming service. In some examples, it may be that this velocity information can be derived from e.g. motion vectors that have been used to encode the video frames.

Alternatively, or in addition, the additional data may indicate the surface normals of one or more objects in the virtual environment. The surface normals in a given image may be detected by inputting the images to a separate deep neural network that has been trained to detect image features corresponding to surfaces having substantially similar surface normals. Alternatively, the surface normals may be determined as part of the rendering process.

In some examples, the surface normals may pertain to one or more objects in a viewing frustrum of the player. For example, the surface normals may be used to identify relatively uniform surfaces such as walls, tables, ceilings, etc. The prediction model may be configured to ensure that the uniformity of these surfaces is preserved in the predicted, future frame (albeit from a potentially different viewing angle). The surface normal information may be included as metadata, along with the image data corresponding the video frames rendered at the one or more cloud devices making up the cloud gaming service.

In alternative or additional examples, the additional data may include material information pertaining to one or more objects in the game scene. Again, this material information may pertain to one or more objects in a viewing frustrum of the player. This material information may include textures that have been applied to three dimensional objects within the scene being displayed to the player. The prediction model may be trained to learn how to warp a given texture, given the previously rendered frame and any player inputs associated therewith. The texture information may be included as metadata, along with the image data making up the frames obtained from the cloud gaming service. The texture information may be generated during the render process.

In yet further alternative or additional examples, depth information associated with the previously rendered video frame(s) may be input to the prediction model. The depth information may include, for example, the z-buffer values or a depth map associated the previously rendered video frame(s). This depth information may be input to the prediction model, along with the previously rendered video frame(s) and the most recent player input(s).

In examples where the prediction model comprises a machine learning model, the machine learning model may be trained with depth information such that the depth information is taken into account when synthesizing subsequent frames. This may involve, for example, ensuring that the positioning of moving objects within the scene respects the depth information associated with e.g. static elements of the virtual environment. The machine learning model may learn to respect depth implicitly, e.g. based on the depth of certain objects in a scene being respected across source and target frames (during the training process).

The surface normal and/or material and/or depth information may be generated as part of the render process; for example, where deferred rendering is used to generate the video frames (at the cloud device). In preferred examples, this additional data is sent to the client and/or intermediate device, from the cloud device, along with the video frames (e.g. RGB frames). The cloud device may be configured to send video frames having a size that is larger than the image content (e.g. RGB pixels), with the surplus pixel regions being used to encode the additional data (e.g. depth, texture, surface normals). Alternatively, the additional information may be sent as a separate image/video so as to benefit from any specific depth/surface normal compression algorithms. In such cases, the separate image may be sent with a frame identifier, indicating that it is linked to a corresponding e.g. RGB frame.

The prediction model may take into account the different types of additional data differently. For example, the depth data may be used by the prediction model to scale an image transformation according to the depth data. As mentioned previously, the depth data may be used to identify different image regions as corresponding to different distances from a viewer, which will require different amounts of e.g. displacement and/or rotation when predicting a subsequent frame. The prediction model may also use the surface normal information to identify hard edges in the image, thereby enabling individual objects to be identified and the blurring between those objects to be reduced. These are just some examples of how the surface normal and depth information may be used by the prediction model.

The additional data may also include, for example, a user's game settings, such as the rate at which a virtual camera is moved by a control stick associated with a user's games controller. This information may be used to predict how the appearance of a given frame is likely to change based on previously received player inputs and the user-settings associated with those inputs.

As mentioned previously, in some examples, the prediction model may be configured to re-project a cloud-rendered video frame, based on a received player input. In these examples, the additional data may relate to the nature with which inputs can be received at the input device. For example, where the input device is a games controller, the additional data may include e.g. a thumb stick acceleration value, dead zone and maximum displacement value (i.e. where the input device comprises a games controller). This information may be used to constrain a predicted pose of the virtual camera and therefore corresponding predicted view of the virtual environment. The predicted pose of the virtual camera may be further constrained by e.g. knowledge of how fast a user is able to realistically provide an input (e.g. move a thumb stick).

It will be appreciated that, where the prediction model comprises a machine learning model, the accuracy of this model will depend on the amount of data that is used to train the model. The more types of data (e.g. surface normals, material information, depth information) that the model is trained with, the greater the computational cost associated with the training. Moreover, it may be desirable to limit the amount of data that is input to the machine learning model, since each input will need to be processed, and the larger the number of inputs the more likely an undesirable delay will be introduced by said processing. As mentioned previously, an aim of the present invention is to reduce the latency associated with cloud-based rendering. Thus, the rate at which future frames can be predicted will need to be quick enough for the player not to have noticed any delay between the outputting of successive frames.

It will be appreciated that the ability to predict subsequent frames may be limited where new objects are coming into a player's view of the virtual environment. For such objects, there may not be sufficient image data in a current frame to predict how that object will appear in a future frame. Hence, in some examples, the cloud devices may be configured to render a wider field of view than the field of view viewable at the player's display, i.e. an area that extends beyond the viewing frustrum of the player. These wider field of view frames may correspond to the video frames that are fed into the prediction model, along with the received player inputs. In this way, the prediction model may take into account parts of the scene that are not visible to the player, including any objects that may be coming into the player's view.

The prediction model may be configured to synthesize video frames corresponding in size to those that are to be displayed, with the wider field of view renders being used by the prediction model to predict what will appear within the region viewable to a player. Alternatively, the prediction model may synthesize wide field video frames, which are subsequently trimmed prior to being output for display. It will be appreciated that, where machine learning is used, these wide field of view renders may be used to train the prediction model, along with any of the additional data described previously.

In additional or alternative examples, the cloud devices may be configured to render, for a given point in time, a plurality of views of the virtual environment. For example, the views may correspond to a virtual camera having been rotated and or translated (i.e. offset) relative to a default position corresponding to the player's current viewpoint. The totality of views may correspond to a larger field of view than is viewable at the player's display. The plurality of views correspond to the same point in time within the video game. For example, for each unit of time, a plurality of offset views (relative to the player's current view) may be rendered, with the content of those views corresponding to the current state of the virtual environment.

The prediction model may be configured to predict a subsequent frame based on each of the viewpoints rendered for a given point in time and the player input(s) associated with that point in time. The plurality of views may be input to a machine learning model (i.e. the prediction model) that has been trained to apply image transformations and or filtering operations to at least some of the views, and to combine them to form a single, predicted video frame for displaying to the player. Combining the different views together may involve using e.g. dithering, linear blending, multi-band blending, seam carving, graph cuts, etc. It will be appreciated that, in some examples, a plurality of views may be generated for each unit of time, and that the views generated for plural different times may be used to predict subsequent frames, along with the player inputs associated with those times.

It will be appreciated that rendering multiple viewpoints of the scene at each render time will incur a higher cost in terms of bandwidth requirements, with more image data needing to be transmitted to the client device, for each scene render. Nonetheless, this increase in bandwidth may still be offset by the reduced frequency with which frames need to be rendered at the cloud device and transmitted to the client device.

It will be appreciated that, where a wider field of view of the virtual environment is rendered (either as a single image, or as plural different viewpoints) by the cloud gaming service, machine learning may not necessarily be needed to perform the synthesis of a subsequent frame. For example, a rule-based method may be used in place of a machine learning model. This may involve, for example detecting a trajectory of one or more objects in the scene, and detecting where those objects will appear in subsequent views of the virtual environment that are to be presented to the player.

In some examples, a combination of machine learning and rule-based methods may be used. For example, machine learning may be used to predict a subsequent frame based on previously rendered frames and received player inputs, with the predicted frame being adjusted based on any objects detected in the wider field of view render of the same scene. The rule-based methods may involve, e.g. calculating where an object will appear in a scene based on one or more motion vectors associated with that object and ensuring that the object is displayed at an appropriate position in the predicted frame.

In further examples, the prediction model (or a separate model) may be trained to identify relatively static areas within the previously rendered video frames, such as e.g. the sky, the majority of a pitch in a sports game, the landscape, etc. and to generate predictions of those areas. These areas may be detected based on a lack of movement associated with those areas (e.g. based on motion vectors, lack of changing pixel values, etc.). The prediction model may predict how the view of the static areas will change based on previously received player inputs and the appearance of those areas in the previous frames.

In examples where the prediction model comprises a trained machine learning model, the identified static regions of the frame may be input to the trained machine learning model (in the form of image data). The machine learning model may be trained to predict (i.e. synthesize) subsequent frames based on image data corresponding to static regions of previously rendered video frames and any corresponding player inputs. This may involve, for example, applying a translation and or rotation of the view, corresponding to a prediction of how the player's view is expected to change.

In examples where machine learning is not used, or is not used in isolation, the prediction model may be configured to re-project the portion(s) of the scene identified as corresponding to static regions.

The dynamic objects in the scene may be rendered at the one or more cloud devices in the usual manner and combined with the (synthesized) remainder of the scene via a blending operation (such as those described previously). The dynamic objects may correspond to e.g. an avatar or vehicle that is under the control of the player, and or other players, NPCs, etc. By having the one or more cloud devices focus on the rendering of dynamic objects in the scene, the amount of time spent rendering and transmitting the new frames to the user may be reduced. The client or intermediate device may be responsible for synthesizing a majority of the game scene and combining the predicted game scene with renderings of objects received from the one or more cloud devices.

It will be appreciated that any of the techniques described above may be used to reduce the perceived latency from player input to viewing the corresponding video frames generated in response to the receipt of that input.

In some examples, the prediction model may be configured to predict a subsequent player input, as well as a future frame. This may involve, for example, training a machine learning model with source frames and target frames, as well as source player inputs and target player inputs. By training the machine learning model with this data, the model can learn to predict subsequent player inputs that are likely to be received and how the scene will likely change in response to those inputs. In some examples, it may be that a separate model is trained to predict subsequent player inputs (based on previously rendered video frames and player inputs), with the output of that model being input to the machine learning model responsible for synthesizing future frames. As will be appreciated, in some situations, it may not be desirable to predict player inputs as this will introduce another level of uncertainty and potentially reduce the accuracy with which future frames can be predicted. However, in some examples, it may be useful to predict a subsequent player input, so that subsequent frames can be predicted further into the future.

In some examples, a computer readable medium having computer executable instructions may be adapted to cause a computer system to perform any of the previously described method steps. The computer readable medium may form part of the client device or intermediate device.

FIG. 3 shows schematically an example of a system for synthesizing video frames in accordance with the present disclosure.

The system comprises a computing device 302 that is in communication with or comprises an input device 304. In FIG. 3, the input device 304 is shown as a games controller that is separate from the computing device. It will be appreciated that, in some examples, the input device 304 may be integral to the computing device. For example, the computing device may correspond to a client device, having e.g. physical buttons, a touchscreen, motion sensor, camera, etc. through which player inputs can be received. It will be further appreciated that the games controller shown in FIG. 3 is just one example of an input device 304 that may be used for receiving player inputs. The input device 304 may correspond to any input device suitable for receiving player inputs.

The computing device 302 comprises an input unit 306 operable to receive player inputs input at the input device 304. In examples where the input device 304 is external to the computing device 302, the input unit 306 may correspond to one or more of e.g. an audio/visual input port, Ethernet port, Bluetooth wireless link, a Wi-Fi wireless link, universal serial bus (USB) port, etc. The inputs received at the input device 304 may be conveyed to the computing device 302 via a wired or wireless connection. In examples where the input device 304 is integral to the computing device 302 (e.g. as physical buttons, touchscreen, motion sensor, etc.) the input unit 306 may correspond to software module at which player inputs are initially received.

The computing device 302 may correspond to a client device that is used to play, or at least display, video frames generated for the video game. In some examples, the computing device 302 may correspond to an intermediate device; that is, a device that sits between an input device and the cloud gaming service. The intermediate device may comprise e.g. a connector, such as USB-connector for connecting the intermediate device to the client device and/or a display device (e.g. via a USB-port). The computing device may comprise any of the previously describes client or intermediate devices.

The computing device 302 is also operable to receive, via a communications network, video frames rendered at one or more cloud devices forming a cloud gaming service 308. The communications network may correspond to a wide area network, such as the Internet. The computing device 302 comprises a network interface 310 operable to receive, via the communications network, frames of a video game rendered at one or more cloud devices making up the cloud gaming service 308. In FIG. 3, the cloud gaming service 308 is represented as a cloud icon. The cloud gaming service 308 may correspond to any of the cloud gaming services described previously (e.g. formed of one or more servers or a network of remote client devices).

The computing device 302 further comprises a prediction unit 312 operable to receive an input from the network interface 310 and the input unit 306 (which in some examples, may form a single input unit 306), and based thereon, synthesize a video frame for output at a display. The synthesized video frame corresponds to a video frame that has been predicted based on one or more video frames previously rendered at a cloud device and player inputs received in response to the display of those frames at a display device.

The prediction unit 312 may comprise a machine learning model (not shown) that has been trained to synthesize future video frames based on video frames previously rendered at a cloud device and player inputs associated with the previously rendered video frames. The machine learning model may be trained to apply an image transformation and or filtering operation to one or more previously rendered frames, based on the content of the previously rendered video frames and player inputs received in response to the output of those frames. Alternatively or in addition, the machine learning model may comprise a generative adversarial network (GAN), as described previously. Generally, the machine learning model may be trained in any of the manners described previously in relation to FIG. 2.

The computing device 302 further comprises an output unit (which in some cases may be the same as the input unit 306, i.e. an input/output unit, and hence is not shown in FIG. 3) operable to output the synthesized video frame to a display device 314. In FIG. 3 the display 314 is shown as being separate from the computing device 302 and may be in communication with the computing device 302 via a wired or wired connection. It will be appreciated that, in some examples, the display 314 may be integral to the computing device 302, which itself may correspond to a client device.

In some examples, the computing device 302 may be configured to receive additional data, e.g. at the input unit 306 and/or network interface 310. As described previously, the additional data may indicate at least one of:
  i. user-selected game settings
  ii. a velocity of one or more objects in a viewing frustrum of the player;
  iii. surface normals of one or more objects in a viewing frustrum of the player;
  iv. material information associated with one or more objects in a viewing frustrum of the player;
  v. depth information associated with one or more objects in a viewing frustrum of the player It may be, for example, that information relating to e.g. velocities of objects, surface normals, textures and depth information is determined at one or more cloud devices, and received at the computing device 302 via the network interface 310 (and thus via the communication network). The user-selected game settings may be received at the input unit 306, e.g. where these are configured at the computing device 302 being used to play the video game. However, this is just an example, and the additional data may be received at any or both of the input unit 306 and network interface 310 as appropriate (e.g. depending on whether it is generated locally or remotely).

In further examples, the video frames rendered at the cloud device may have a wider field of view than the frames that are to be output at the display. As described previously, this may allow objects that are not within a player's current view of a virtual environment to be detected and taken into account when synthesizing subsequent video frames. The network interface 310 may therefore be operable to receive such frames and to provide these as an input to the prediction unit 312. The prediction unit 312 may be configured to synthesize subsequent video frames based on these wider field of view frames and any player inputs associated with those frames (as described previously).

In further or alternative examples, the video frames rendered at the cloud device may correspond to a plurality of viewpoints of a virtual environment at a given (i.e. the same) point in time. As described previously, this may correspond to a plurality of views of the virtual environment, with each view being offset (e.g. translated and or rotated) relative to a central viewpoint corresponding to a player's current or most recent view of the virtual environment. The prediction unit 312 may be configured to receive each of these viewpoints for a given point in time, and to predict a subsequent video frame based on the content of those viewpoints and any player inputs associated with the corresponding point in time. In some examples, it may be that the plurality of viewpoints generated for multiple, previous units of time (e.g. the viewpoints generated for the last 5 frames) are used by the prediction unit 312 to predict the subsequent frame. Synthesizing the subsequent video frame may involve combining at least some of the plurality of viewpoints together, as described previously.

In yet further or alternative examples, the computing device 302 comprises an identification unit operable to identify regions within the video frames rendered at the cloud device that correspond to static regions of virtual environment. The identification unit may correspond to a software module having a suitably trained model installed thereon.

Identifying the static regions may involve, for example, identifying regions across frames for which pixel values are changing below a threshold amount. An indication of the identified regions may be provided as an input to the prediction unit 312, which then synthesizes the corresponding regions for the subsequent frame. This synthesis may involve predicting a subsequent view of the static region (e.g. translation and/or rotation of a virtual camera). The dynamic regions of the scene, such as moving game objects, may be rendered at the cloud device and received at the network interface 310. The prediction unit 312 may then combine these renderings with the synthesized static region of the game scene so as to generate a synthesized, composite frame that is to be output for display.

It will be appreciated that, in some examples, the prediction unit 312 may not rely (or solely rely) on the use of machine learning. For example, the prediction unit may be configured to receive a player input (via the input unit) and in response thereto, re-project a previously rendered video frame, based on the received player input. In these examples, the subsequent frame may be synthesized via re-projection.

The prediction unit may be configured to obtain additional data relating to physical constraints on the receipt of player inputs. For example, where the games controller comprises a thumb stick, the prediction unit may be provided with an acceleration value, dead zone and maximum displacement of the thumb stick, and this information may be used to constrain the predicted (i.e. re-projected) view of the virtual environment. Further information, such as e.g. the maximum or average speed at which a player can provide an input may also be used to limit the predicted view.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of generating video frames at a client device for a cloud-based video game, the method comprising:
    obtaining, via a communications network, a plurality of video frames of a video game rendered at a cloud device;
    obtaining a player input received at an input device, the input device being used to play the video game, the player input being used to play the video game and being received in response to the display of at least one of the plurality of video frames;
    inputting at least one of the plurality of video frames and the player input, which is being used to play the video game, into a trained machine learning model comprised by the client device; and
    predicting, via the trained machine learning model, a subsequent video frame for output at a display based on the at least one of the obtained video frames and the player input, which is being used to play the video game, and outputting the subsequent video frame at the display, wherein:
    at least some of the plurality of video frames obtained from the cloud device correspond to video frames having a wider field of view than a field of view of the subsequent video frame that is to be output at the display, and
    inputting the at least one of the plurality of video frames into the trained by machine learning model comprises inputting a wider field of view frame to the trained machine learning model, the wider field of view frame including an object coming into the player's view.

2. The method according to claim 1, wherein the trained machine learning model has been trained to predict at least a first video frame based on the plurality of video frames and player input, the trained machine learning model being trained with previously rendered video frames of a video game and corresponding player inputs received in response to the output of those video frames.

3. The method according to claim 2, wherein the trained machine learning model comprises a trained generative adversarial network.

4. The method according to claim 1, wherein generating the video frame comprises at least one of applying an image transformation to and filtering the at least one video frame that is input to the trained machine learning model.

5. The method according to claim 1, comprising
    obtaining additional data associated with the plurality of video frames obtained from the cloud device, the additional data indicating at least one of:
    i. user-selected game settings;
    ii. a velocity of one or more objects in a viewing frustum of the player;
    iii. surface normals of one or more objects in a viewing frustrum of the player;
    iv. material information associated with one or more objects in a viewing frustrum of the player;
    v. depth information associated with one or more objects in a viewing frustrum of the player; and
    inputting the additional data associated with the at least one video frame to the trained machine learning model.

6. The method according to claim 1, wherein at least some of the plurality of video frames obtained from the cloud device correspond to different viewpoints of a virtual environment at the same point in time;
    wherein inputting the at least one of the plurality of video frames into the trained machine learning model comprises inputting the plurality of video frames corresponding to different viewpoints to the trained machine learning model; and
    wherein generating the subsequent video frame comprises blending at least some of the video frames corresponding to different viewpoints together, based on the output of the trained machine learning model.

7. The method according to claim 1, comprising:
    identifying a static region in the plurality of video frames obtained from the cloud gaming device; and
    wherein inputting the at least one of the plurality of video frames into the trained machine learning model comprises inputting image data corresponding to the identified static region to the trained machine learning model.

8. A non-transitory, computer readable storage medium having computer executable instructions stored thereon, which when executed by a computer system acting as a client device, cause the computer system to perform a method of generating video frames for a cloud-based video game, by carrying out actions, comprising:
    obtaining, via a communications network, a plurality of video frames of a video game rendered at a cloud device;
    obtaining a player input received at an input device, the input device being used to play the video game, the player input being used to play the video game and being received in response to the display of at least one of the plurality of video frames;
    inputting at least one of the plurality of video frames and the player input, which is being used to play the video game, into a trained machine learning model comprised by the client device; and
    predicting, via the trained machine learning model, a subsequent video frame for output at a display based on the at least one of the obtained video frames and the player input, which is being used to play the video game, and outputting the subsequent video frame at the display, wherein:
    at least some of the plurality of video frames obtained from the cloud device correspond to video frames having a wider field of view than a field of view of the subsequent video frame that is to be output at the display, and
    inputting the at least one of the plurality of video frames into the trained by machine learning model comprises inputting a wider field of view frame to the trained machine learning model, the wider field of view frame including an object coming into the player's view.

9. A client computing device comprising:

a network interface operable to receive, via a communications network, a plurality of video frames of a video game rendered at a cloud device;

an input unit operable to receive player inputs input at an input device, the input device being used to play the video game, the player input being used to play the video game and being received in response to the display of at least one of the plurality of video frames;

a prediction unit operable to receive an input from the network interface and the input unit, the input comprising at least one of the obtained video frames and the player input, which is being used to play the video game, and comprising a trained machine learning model to receive the input comprising at least one of the plurality of video frames and the player input and to predict a subsequent video frame for output at a display; and an output unit operable to transmit the subsequent video frame to a display, wherein:

at least some of the plurality of video frames obtained from the cloud device correspond to video frames having a wider field of view than a field of view of the subsequent video frame that is to be output at the display, and inputting the at least one of the plurality of video frames into the trained by machine learning model comprises inputting a wider field of view frame to the trained machine learning model, the wider field of view frame including an object coming into the player's view.

10. The client computing device according to claim 9, wherein the trained machine learning model has been trained to predict video frames based on previously rendered video frames and corresponding player inputs.

11. The client computing device according to claim 9, wherein the input unit and or network interface is configured to receive additional data indicating at least one of:
i. user-selected game settings;
ii. a velocity of one or more objects in a viewing frustum of the player;
iii. surface normals of one or more objects in a viewing frustrum of the player;
iv. material information associated with one or more objects in a viewing frustrum of the player;
v. depth information associated with one or more objects in a viewing frustrum of the player;

and wherein the prediction unit is further operable to predict the subsequent video frame based on the additional data.

12. The client computing device according to 10, wherein the plurality of video frames rendered at the cloud device correspond to a plurality of viewpoints of a virtual environment, the plurality of views corresponding to the same point in time within the video game; and wherein the prediction unit is operable to predict the subsequent video frame based on the plurality of viewpoints, the prediction unit being operable to predict the subsequent video frame by combining at least some of the viewpoints together.

13. The client computing device according to claim 10, comprising:

an identification unit operable to identify regions within the plurality of video frames rendered at the cloud device corresponding to static regions of a virtual environment; and wherein the prediction unit is operable to predict at least some of a subsequent video frame based on the identified static regions.

14. The client computing device according to claim 13, wherein the prediction unit is operable to predict regions of the subsequent video frame that have been identified as corresponding to static regions of a virtual environment; and wherein the network interface is operable to receive renderings of dynamic objects from the cloud device, for combining with the static regions of the scene predicted by the prediction unit.

15. The client computing device according to claim 9, wherein the computing device corresponds to a client device, the client device being configured to access one or more video games stored at the cloud device via the communications network.

16. The client computing device according to claim 9, wherein the computing device corresponds to an intermediate device located between a client device and the cloud device;

wherein the intermediate device is in communication with the client device via a wired or wireless connection; and wherein the intermediate device is in communication with the cloud device via the communications network.

* * * * *